United States Patent [19]

Kitograd

[11] Patent Number: 4,649,667
[45] Date of Patent: Mar. 17, 1987

[54] MULTI-PURPOSE COLLAPSIBLE BOX

[76] Inventor: Edward K. Kitograd, 5 Empire Ct., Commack, N.Y. 11725

[21] Appl. No.: 717,907

[22] Filed: Mar. 29, 1985

[51] Int. Cl.$^4$ ............................ A01G 9/02; B65D 6/00
[52] U.S. Cl. ......................................... 47/66; 220/4 F
[58] Field of Search ............ 220/4 F; 217/43 R, 12 R; 47/73, 66

[56] References Cited

U.S. PATENT DOCUMENTS

| | | | |
|---|---|---|---|
| 446,579 | 2/1891 | Brown | 217/43 |
| 927,261 | 7/1909 | Mengel | 217/12 R |
| 3,006,496 | 10/1961 | Weiman | 47/73 X |
| 3,064,845 | 11/1962 | Maxwell | 217/43 |
| 3,093,259 | 6/1963 | Morrison | 220/4 F X |
| 3,261,493 | 7/1966 | Smith | 220/4 F X |
| 3,316,460 | 4/1967 | Scoville | 220/4 F X |

FOREIGN PATENT DOCUMENTS

| | | | |
|---|---|---|---|
| 239677 | 4/1950 | Australia | 220/4 F |
| 468570 | 1/1952 | Italy | 47/66 |
| 4522 | of 1895 | United Kingdom | 47/73 |
| 182900 | 7/1922 | United Kingdom | 220/4 F |

*Primary Examiner*—James R. Feyrer
*Assistant Examiner*—Danton DeMille
*Attorney, Agent, or Firm*—Leonard Belkin

[57] ABSTRACT

A multi-purpose collapsible container made up of six identical planar panels of rectangular shape with a length double its width. One long edge of each panel is squared off whereas the other three edges are beveled at a 45° angle. Two panels make up the bottom. L-shaped dowel members join the panels along their beveled edges.

2 Claims, 7 Drawing Figures

U.S. Patent     Mar. 17, 1987     4,649,667
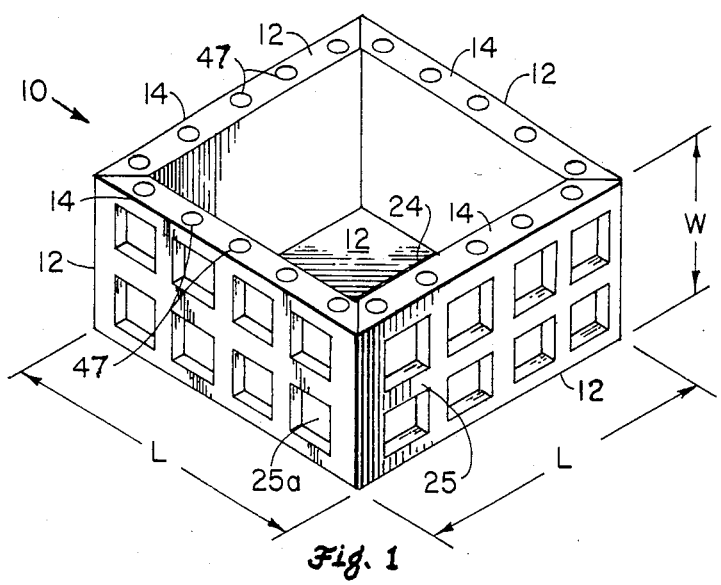
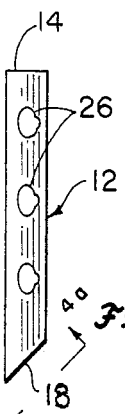
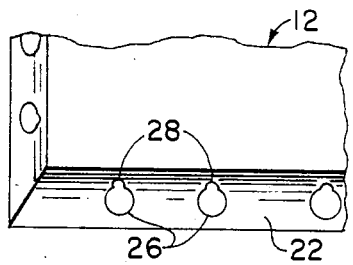
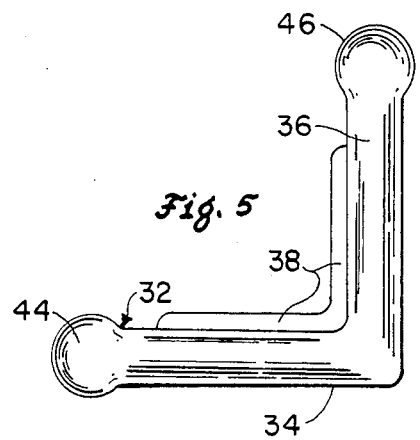
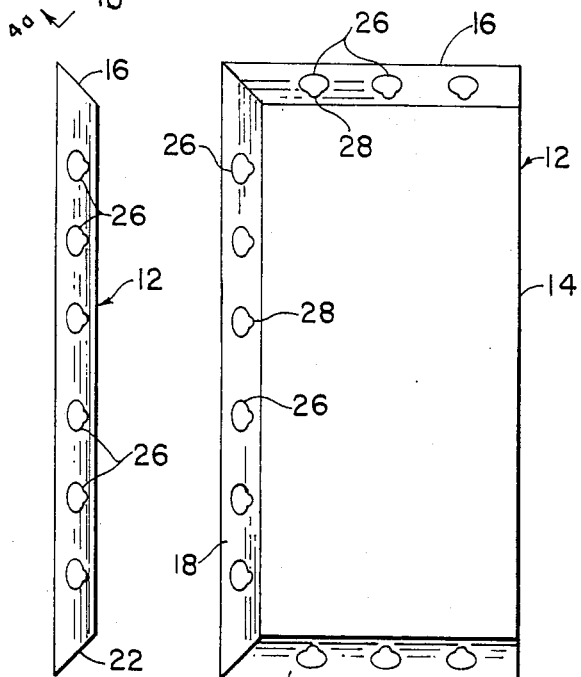
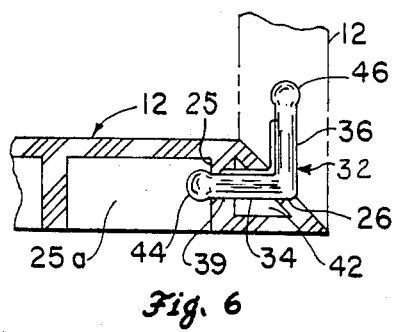

MULTI-PURPOSE COLLAPSIBLE BOX

BACKGROUND OF THE INVENTION

This invention relates to a multi-purpose collapsible box and more particularly to a knock-down container of the type which is useful for growing plants under restricted space conditions.

During recent years there has been increasing interest in the growing of vegetables and other plants in so-called mini-farms. The latter has reference to the use of space on rooftops, windowsills, patios, driveways, and restricted or enclosed spaces in yards, lawns and fields. In many cases, the mini-farm consists of containers which are arranged to occupy the area available for farming. In addition, containers are useful even in yards and fields because their use makes it more convenient to practice raised bed gardening where it is possible to blend together effectively varieties of plants having different requirements of space, height, moisture, etc. In addition, the use of containers makes it possible to provide access to any part of the garden without stepping on plants or the root systems, and, further provides protection against above and below ground pests such as moles and rabbits.

Containers which are presently available for this purpose do not make the most effective use of the space available in mini-farms and, in addition, they create a problem of storage when not in use. Even a box which is capable of disassembly when not in use can be a problem in reassembling, especially when there are several boxes and the proper parts must be matched to put them together.

SUMMARY OF THE INVENTION

The present invention improves upon the usefulness of mini-farms by providing a box shaped to maximize use of the available space and which is collapsible into interchangeable parts so that when they are reassembled it is not necessary to match parts.

A preferred embodiment of this invention consists of a knock-down, open-topped, square container comprising a plurality of identical planar panels. Each panel has a length twice its width, one edge along its length being squared off, whereas all other edges are beveled or chamfered at a 45° angle sloping toward the inside of the container. Two of the panels placed side by side with their squared edges abutting or flush with each other form the bottom of the container while each of the remaining panels forms one side wall of the container, with their beveled edges adjoining the beveled edges of the bottom panels and adjacent side walls. The squared off edge of each of the panels making up the side walls forms the flat upper edge of the container. All of the beveled edges are provided with L-shaped dowel members extending into adjoining surfaces of the beveled edges to insure that the container retains its configuration.

The knock-down container of this invention is readily disassembled after use and convenient to clean and store. Reassembly of the panels is convenient and simple because all panels are identical, and it is not necessary to determine which panels make up the side walls and which are the bottom.

It is thus a principal object of this invention to provide a collapsible box made of identical panels and is readily assembled and disassembled.

Other objects and advantages of this invention will be readily apparent from the following description of preferred embodiments of this invention.

BRIEF DESCRIPTION OF THE FIGURES

FIG. 1 is an isometric view of a container constructed in accordance with the principles of this invention.

FIG. 2 is a plan view of one of the panels making up the container shown in FIG. 1.

FIG. 3 is a view from the left of the panel shown in FIG. 2.

FIG. 4 is a view looking down on the panel shown in FIG. 3.

FIG. 4a is a view along 4a—4a of FIG. 4.

FIG. 5 is a side view of a dowel member.

FIG. 6 is a detail of a side view of one edge of a panel.

DETAILED DESCRIPTION OF THE PREFERRED EMBODIMENT

Referring to FIG. 1, container 10 consists of six identical planar panels 12 assembled as shown. Container 10 has an open top, is square in configuration, and each of panels 12 has a length L which is double its width W.

For details of each panel 12, reference is made to FIGS. 2, 3, 4, and 4a. There it is seen that panel 12 has one flat, right-angled or squared off edge 14 and three edges 16, 18, and 22 which are beveled at a 45° angle. Thus, when panels 12 are assembled as shown in FIG. 1, the flat edges 14 form the top surfaces of container 10 while the surfaces of the beveled edges form all the corners. The two panels 12 on the bottom of container 10 have their flat edges 14 flush against each other forming a joint 24 as seen in FIG. 1.

Panels 12 are preferably made out of plastic material. In order to minimize the weight and cost of the panels and at the same time retain rigidity and strength, panels 12 are undercut to form ribs 25 and square pockets 25a.

In order to hold panels 12 together when assembled, each of the beveled surfaces is provided with a plurality of spaced holes 26 each having a groove 28 for a purpose to be described. Holes 26 as seen in FIGS. 2 and 3 are parallel with the planar surfaces of the panel. To join adjacent panels 12, an L-shaped dowel member 32, as seen in FIG. 5 is employed. Each dowel member 32, preferably made from a rigid plastic material, is circular in cross section, is L-shaped with legs 34 and 36 of equal length and is provided with a spine 38 to slide in slot 28 of each hole 26 to prevent rotation of the dowel member.

As seen in FIG. 6, leg 34 of dowel member 32 is inserted in hole 26 and penetrates hole 39 in a rib 25 with leg 36 extending out so that when adjacent panel 12 (shown in phantom) is put in place all of the protruding legs 36 will slip in matching holes 26. Cavity 42 is a hollow section designed also to reduce the weight and cost of panel 12. Dowel member 32 is provided with enlarged ends 44 and 46 so that dowel member 32 can be snapped in place and provide a more secure attachment. All holes 26 are equispaced and oriented so that any panel 12 can be interchanged with any other.

It will be noted from FIG. 1 that flat edges 14 of panels 12 incorporate openings 47 which are spaced at designated intervals, i.e., six inches, which can serve not only as a means of producing perfect rows of plants, but can accommodate stakes for these plants, i.e., tomatoes, which require support. Openings 47 can be employed also for stacking boxes, using short stakes to line up and maintain the stack of boxes securely in place, and, also, to permit the addition of a clear cover to convert the box into a mini-hothouse, thus extending the growing season.

The container embodying the principles of this invention described herein is not only useful for growing a variety of plants, but several boxes can be placed together either adjoining each other or spaced to provide for walkthroughs to make the plants readily accessible to the gardener. The containers may be conveniently placed at different elevations to accommodate the differing requirements of the varieties of plants as to light and space to grow.

Also, the configuration of the box lends itself readily to the conservation of water, fertilizer, and plant-preserving chemicals, since none is wasted on areas where no growing is taking place.

The configuration of the box permits greater control over soil management than does ordinary row planting, by allowing the user to adapt the growing medium to the particular needs of the crop. For example, in adjacent boxes the user can provide soils that vary in texture and acidity without the characteristics of the soil in one box affecting those of the soil in any other box.

Furthermore, containers designed in accordance with this invention can be employed not only for growing plants, but also as whelping boxes, and with plastic liners, for sand boxes, for the hydroponic growing of plants, as well as other possible applications which may come to mind. The containers are readily disassembled and cleaned, and can be either stored or reassembled for different application.

The light weight and compact size of the box when disassembled and packed for transport make it convenient to take in public, as well as private vehicles. Thus the user can take it to the beach, the park, or to any other recreational facility even if he or she goes by bus or train. There it can be used as a playpen, sandbox, or, with a soft plastic liner, as a wading pool.

While it is anticipated that the containers herein described may be constructed out of plastic, they can also be made from other rigid materials such as wood, aluminum or other metals as well.

While only certain preferred embodiments of this invention have been described, it is understood that many variations are possible without departing from the principles of this invention as defined in the claims which follow.

What is claimed is:

1. A knock-down, open-topped, square container comprising a plurality of identical planar panels, each of said panels having a length which is double its width, one edge along its length being squared off, and all othe edges of said panel being beveled at a 45° angle sloping toward the inside of said container, so that two of said panels placed side by side with their square edges flush against each other form the bottom of said container, each of the remaining panels forming one side of said container, and joining means mounted in the beveled edges of said panels to permit positive engagement of adjoining panels, said joining means comprising L-shaped members, each of said L-shaped members having legs circular in cross section and having a spine along each leg, each of said beveled edges being provided with spaced holes each to accommodate one leg of an L-shaped member, each hole being circular in cross section with a slot to accomodate a spine, said L-shaped members thereby holding adjoining panels together, said spines preventing rotation of each of said L-shaped members.

2. The container of claim 1 in which said panels are hollowed out and each of said L-shaped members is provided with an enlarged tip at the free end of each leg to permit the latter to snap into place.

* * * * *